UNITED STATES PATENT OFFICE.

THOMAS W. SMILLIE, OF WASHINGTON, DISTRICT OF COLUMBIA, ASSIGNOR TO GEORGE T. BECK, OF CODY, WYOMING.

WATERPROOFING COMPOUND.

1,087,696. Specification of Letters Patent. Patented Feb. 17, 1914.

No Drawing. Application filed March 31, 1913. Serial No. 757,870.

*To all whom it may concern:*

Be it known that I, THOMAS W. SMILLIE, of Washington, in the District of Columbia, have invented certain new and useful Improvements in Waterproofing Compounds; and I hereby declare that the following is a full, clear, and exact description thereof.

This invention is a new and useful waterproofing and preserving compound especially designed and adapted for waterproofing and preserving fabrics, paper, felt, straw, leather and various other materials, which it is desired to protect from moisture.

The object of the invention is to provide a waterproofing compound which can be used for waterproofing the materials mentioned, for delicate fabrics and articles of personal wear and adornment; and also books and documents which it is desired to preserve.

The novel compound consists of a carefully tempered combination of a non-drying fish oil, hereinafter named, and paraffin wax, dissolved in a light volatile hydrocarbon such as gasolene or benzin.

Specifically, a compound suitable for waterproofing medium weight fabrics, manuscript documents, and the like, would be as follows:—blackfish oil 3 ounces, white paraffin wax 4 ounces, dissolved in benzin (or gasolene) 1 gallon.

The relative proportions of the oil and paraffin used in the compound are constant; but the amount of solvent employed may be varied according to the weight and character of the fabric or material being treated.

The article or material to be treated is submerged in such solution and then dried. The benzin evaporates and leaves an invisible but durable coating of the waterproofing compound upon the fibers of the material.

The blackfish oil combined with paraffin and dissolved in a light hydrocarbon as described, produces a waterproofing compound which can be applied to delicate fabrics without injuring their appearance and will render same waterproof without the waterproofing compound, deposited thereon and on the fibers thereof, being noticeable; and this compound will preserve and waterproof materials thoroughly and effectively.

I have also found that a mineral hydrocarbon oil having a s. g. of from 0.844 to 0.860 can be used for some materials in lieu of the blackfish oil; but such mineral oil is not as desirable as the blackfish oil, and the latter produces the most efficient, and a superior, waterproofing compound; and blackfish oil should be used in preparing a compound for waterproofing all delicate fabrics or where the best results are desired.

In place of benzin, gasolene or a like light evanescent hydrocarbon could be used, which will dissolve the oil and paraffin and disappear from the coating by evaporation without discoloring the material.

The success of the invention resides in the fact that blackfish oil mixed with paraffin in the proportions described, has a peculiar tempering effect upon the paraffin; and when dissolved in a volatile hydrocarbon it will produce a thin flexible but invisible water-repellent coating upon the fiber or surface of the fabric or articles treated without affecting their color or texture.

What I claim is:

1. The herein described waterproofing compound consisting of blackfish oil, and paraffin wax, dissolved in an evanescent liquid hydrocarbon, substantially as described.

2. The herein described waterproofing compound consisting of blackfish oil and paraffin wax, in the proportion of three parts of such oil to four parts of the paraffin wax, dissolved in an evanescent liquid hydrocarbon, substantially as described.

In testimony that I claim the foregoing as my own I affix my signature in presence of two witnesses.

THOMAS W. SMILLIE.

Witnesses:
GEORGE T. BECK,
ARTHUR E. DOWELL.